US012798340B2

(12) United States Patent
Yamamoto et al.

(10) Patent No.: US 12,798,340 B2
(45) Date of Patent: Nov. 17, 2026

(54) VEHICLE SIDE DOOR

(71) Applicant: SUBARU CORPORATION, Tokyo (JP)

(72) Inventors: Chihiro Yamamoto, Tokyo (JP); Shunki Okajima, Tokyo (JP); Shunsuke Soga, Tokyo (JP); Yoshimasa Andou, Tokyo (JP)

(73) Assignee: Subaru Corporation, Tokyo (JP)

(*) Notice: Subject to any disclaimer, the term of this patent is extended or adjusted under 35 U.S.C. 154(b) by 251 days.

(21) Appl. No.: 18/198,555

(22) Filed: May 17, 2023

(65) Prior Publication Data

US 2023/0391169 A1 Dec. 7, 2023

(30) Foreign Application Priority Data

Jun. 3, 2022 (JP) ................................ 2022-090881

(51) Int. Cl.
*B60J 5/04* (2006.01)

(52) U.S. Cl.
CPC ........... *B60J 5/0443* (2013.01); *B60J 5/0437* (2013.01); *B60J 5/0461* (2013.01)

(58) Field of Classification Search
CPC ...... B60J 5/0443; B60J 5/0444; B60J 5/0437; B60J 5/0461; B60J 5/0451; B60J 5/042; B60J 5/0422; B60J 5/0455; B60J 5/0456
USPC ...................................................... 296/146.6
See application file for complete search history.

(56) References Cited

U.S. PATENT DOCUMENTS 5,094,034 A * 3/1992 Freeman ................ B60J 5/0452 49/501
6,612,639 B2 * 9/2003 Ishikawa ................ B60J 5/0429 49/502
8,152,219 B2 * 4/2012 Suzuki .................. B60J 5/0468 296/146.7
8,235,451 B2 * 8/2012 Jordan .................. E05B 77/02 296/146.1

(Continued)

FOREIGN PATENT DOCUMENTS

DE 9208568 U1 * 9/1992
DE 102006058108 A1 * 6/2008 ........... B60J 5/0431

(Continued)

OTHER PUBLICATIONS

Translation of KR 19980038539 Description (Year: 1998).*

(Continued)

*Primary Examiner* — Amy R Weisberg
*Assistant Examiner* — Veronica M Condo
(74) *Attorney, Agent, or Firm* — McGinn IP Law Group, PLLC

(57) ABSTRACT

A vehicle side door for a vehicle includes an inner panel, a door beam, and a bracket. The inner panel includes a wall extending in a direction intersecting a panel main body extending in a front-rear direction of a vehicle body. The door beam extends in the front-rear direction of the vehicle body and is joined to a front portion of the inner panel and a rear portion of the inner panel. The bracket is interposed between the inner panel and the door beam. The bracket includes a beam joint welded in surface contact with an end of the door beam, and a panel joint welded in surface contact with the wall of the inner panel.

15 Claims, 10 Drawing Sheets

(56) References Cited

U.S. PATENT DOCUMENTS

| | | | | |
|---|---|---|---|---|
| 8,414,038 | B2 * | 4/2013 | Bedekar | E05B 77/04 292/216 |
| 8,727,421 | B2 * | 5/2014 | Cohoon | B60J 5/0444 296/146.6 |
| 8,789,872 | B2 * | 7/2014 | Johansson | B60J 5/0437 427/435 |
| 8,857,891 | B2 * | 10/2014 | Jeon | B60J 5/0455 296/146.6 |
| 8,955,257 | B2 * | 2/2015 | Moriya | B60J 5/042 49/502 |
| 8,960,768 | B2 * | 2/2015 | Kato | B62D 25/04 296/187.12 |
| 9,168,884 | B2 * | 10/2015 | Horner | B60R 21/013 |
| 9,266,412 | B2 * | 2/2016 | Fujihara | B60J 5/0437 |
| 9,573,445 | B2 * | 2/2017 | Ogawa | B60J 5/0484 |
| 10,232,688 | B2 * | 3/2019 | Schmitt | B60J 5/0433 |
| 11,628,711 | B2 * | 4/2023 | Soma | B60J 5/0431 296/146.6 |
| 11,724,577 | B2 * | 8/2023 | Kasuya | B60J 5/045 49/503 |
| 11,820,211 | B2 * | 11/2023 | Hasegawa | B60J 5/0443 |
| 11,840,127 | B2 * | 12/2023 | Kovie | B60J 5/0433 |
| 12,172,501 | B2 * | 12/2024 | Snyder | E05B 79/20 |
| 2005/0001448 | A1 * | 1/2005 | Omori | B60J 5/0461 296/187.05 |
| 2012/0036785 | A1 * | 2/2012 | Bedekar | E05B 77/04 49/394 |
| 2014/0246879 | A1 * | 9/2014 | Ishigame | B60J 5/0443 296/146.6 |
| 2015/0367715 | A1 * | 12/2015 | Inamoto | B60J 5/0443 296/146.6 |
| 2017/0274744 | A1 * | 9/2017 | Hirakawa | B60J 5/0456 |
| 2020/0408004 | A1 * | 12/2020 | Contreras | E05B 77/36 |
| 2021/0023919 | A1 * | 1/2021 | Suzuki | B60J 5/0443 |
| 2021/0238895 | A1 * | 8/2021 | Kovie | B60J 5/0433 |

FOREIGN PATENT DOCUMENTS

| | | | | | |
|---|---|---|---|---|---|
| DE | 102014207060 | A1 | * | 10/2014 | B60J 5/0437 |
| FR | 2698322 | A1 | * | 5/1994 | B60J 5/0429 |
| JP | 2006-077490 | A | | 3/2006 | |
| JP | 2008-068822 | A | | 3/2008 | |
| JP | 2009144416 | A | * | 7/2009 | |
| JP | 2020-117002 | A | | 8/2020 | |
| KR | 970026141 | A | * | 6/1997 | B60J 5/0459 |
| KR | 19980011116 | U | * | 5/1998 | B60R 21/12 |
| KR | 19980015463 | U | * | 6/1998 | B60J 5/0451 |
| KR | 19980038539 | A | * | 8/1998 | |
| KR | 19980038539 | U | * | 9/1998 | B60J 5/0443 |
| KR | 200142126 | Y1 | * | 6/1999 | B60J 5/0456 |
| KR | 20080109183 | A | * | 12/2008 | B60J 5/0437 |
| KR | 20170091384 | A | * | 8/2017 | B60J 5/0416 |

OTHER PUBLICATIONS

Translation of KR 200142126 Description (Year: 1999).*
Translation of KR 20080109183 Description (Year: 2008).*
Translation of KR 20170091384 (Year: 2017).*
Translation of KR 19980015463 (Year: 1998).*
Translation of JP2009144416 (Year: 2009).*
Japanese Office Action dated Dec. 2, 2025 in Japanese Patent Application No. 2022-090881 with machine English translation.

* cited by examiner

VEHICLE SIDE DOOR

CROSS-REFERENCE TO RELATED APPLICATIONS

The present application claims priority from Japanese Patent Application No. 2022-090881 filed on Jun. 3, 2022, the entire contents of which are hereby incorporated by reference.

BACKGROUND

The disclosure relates to a vehicle side door provided with a door beam for reinforcement between an outer panel and an inner panel.

In general, the door beam (impact beam) is provided inside the vehicle side door. The door beam contributes to protecting an occupant by preventing deformation of a door panel toward a vehicle cabin in a side collision of a vehicle or the like. Such a door beam is joined to the inner panel constituting the side door by welding or the like.

Regarding a configuration of attaching the door beam to the inner panel, various techniques are proposed. For example, Japanese Unexamined Patent Application Publication (JP-A) No. 2020-117002 discloses a technique of joining a rear end of a door beam, which has particularly high durability, to the inner panel via a bracket. In the technique disclosed in JP-A No. 2020-117002, the bracket includes a flange having a chevron-shaped cross-section with a ridge line extending along an extension line of the door beam. This flange is joined to a bracket installation region of the inner panel in a surface contact state. With this joining, in the technique disclosed in JP-A No. 2020-117002, occurrence of local stress concentration at a joining position is prevented, and attaching rigidity of the rear end of the door beam to the inner panel is enhanced. Further, by enhancing the attaching rigidity of the door beam in this manner, the technique disclosed in JP-A No. 2020-117002 enhances durability with respect to an impact load at the time of opening and closing the side door and a collision load in the side collision or the like of the vehicle.

SUMMARY

An aspect of the disclosure provides a vehicle side door for a vehicle. The vehicle side door includes an inner panel, a door beam, and a bracket. The inner panel includes a wall extending in a direction intersecting a panel main body extending in a front-rear direction of a vehicle body of the vehicle. The door beam extends in the front-rear direction of the vehicle body and is joined to a front portion of the inner panel and a rear portion of the inner panel. The bracket is interposed between the inner panel and the door beam. The bracket includes a beam joint welded in surface contact with an end of the door beam, and a panel joint welded in surface contact with the wall of the inner panel.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to explain the principles of the disclosure.

DETAILED DESCRIPTION

In recent years, there is a trend to demand a higher level of safety for an occupant against a side collision or the like. In order to secure safety at such a higher level, various improvements are to be achieved, such as further improving attaching rigidity of a door beam to an inner panel.

It is desirable to provide a vehicle side door that can improve safety of an occupant against a side collision.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
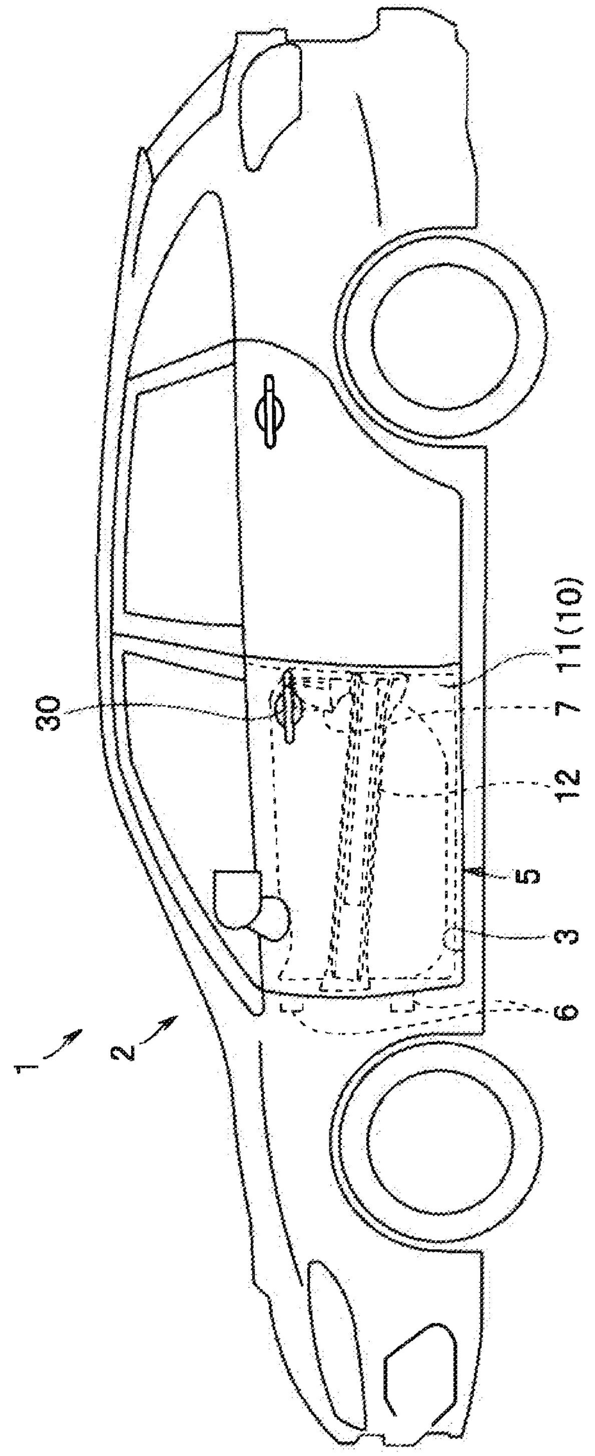
FIG. 1 is a side view of a vehicle.
Figure 2:
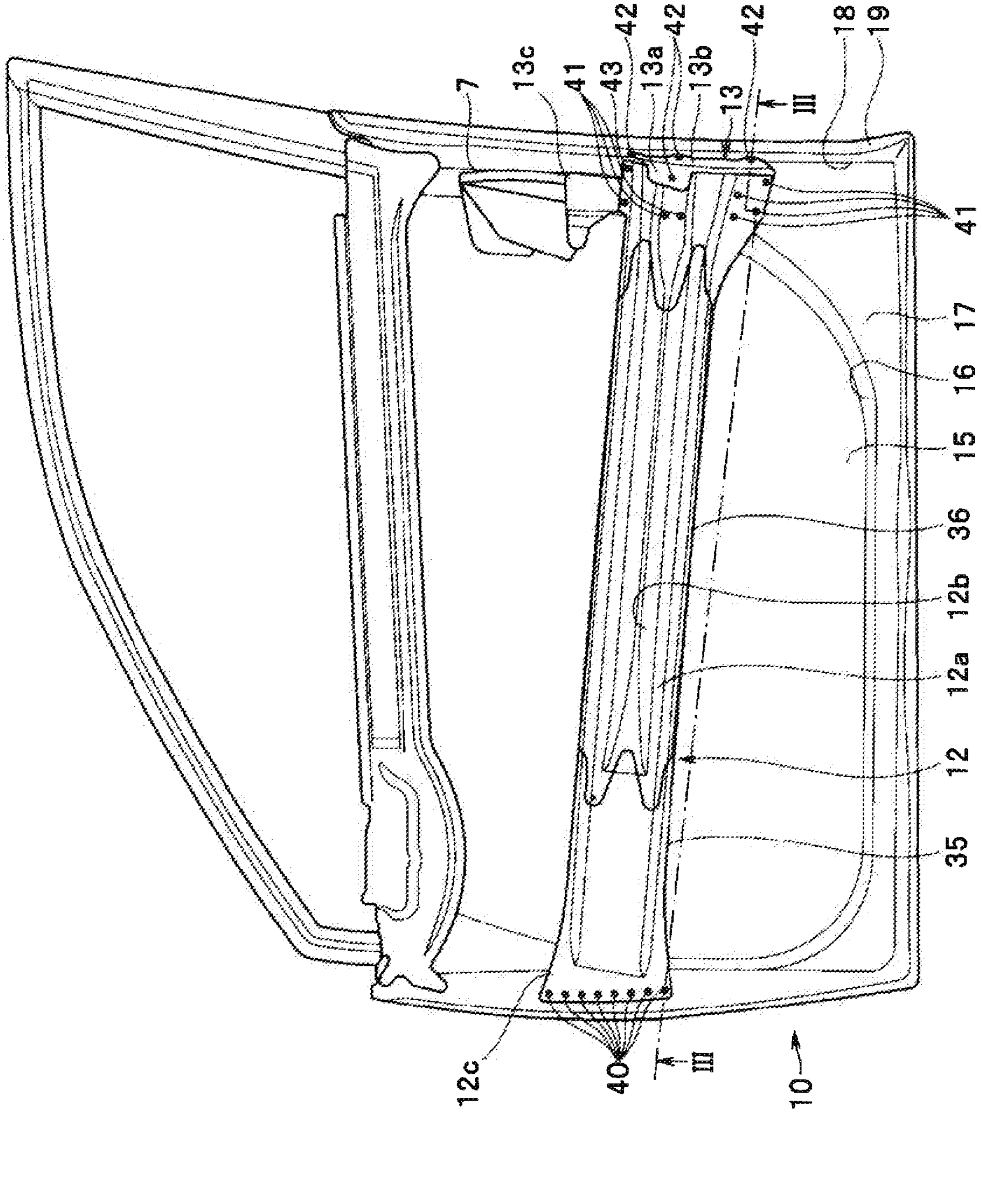
FIG. 2 is a side view of a side door with an outer panel removed.

FIG. 1 is a left side view of a vehicle, and FIG. 2 is a side view of a side door with an outer panel removed, according to the embodiment of the disclosure. In the drawings used in the following description, the elements are illustrated on different scales in order to have dimensions recognizable on the drawings. Therefore, the disclosure is not limited to the number of elements, shapes of the elements, ratios of sizes of the elements, and relative positional relationships of the elements illustrated in the drawings.

In the following description, as an example of a configuration of a vehicle side door, a configuration of a front side door 5 (hereinafter, simply referred to as "door 5") will be described.

As illustrated in FIG. 1, a vehicle body 2 of a vehicle 1 includes a door opening 3 at a side of a front seat. The door 5 that opens and closes the door opening 3 is provided in the door opening 3.

The door 5 is, for example, a swing door that can swing in a vehicle width direction of the vehicle body 2. Therefore, a front portion of the door 5 is supported by a front portion of the door opening 3 via a pair of upper and lower hinges 6. In addition, a rear portion of the door 5 can be locked to a rear portion of the door opening 3 via a ratchet mechanism 7 described later.

Figure 3:
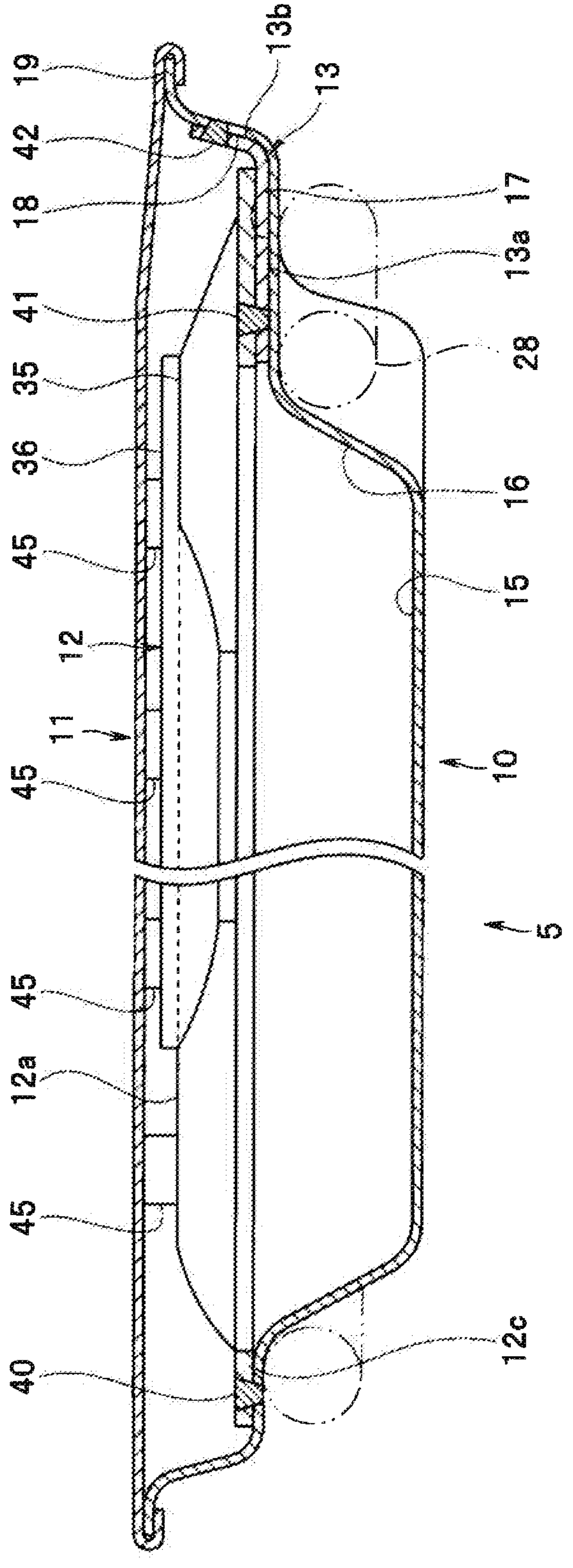
FIG. 3 is a cross-sectional view of a part of the side door taken along a line III-III in FIG. 2.
Figure 4:
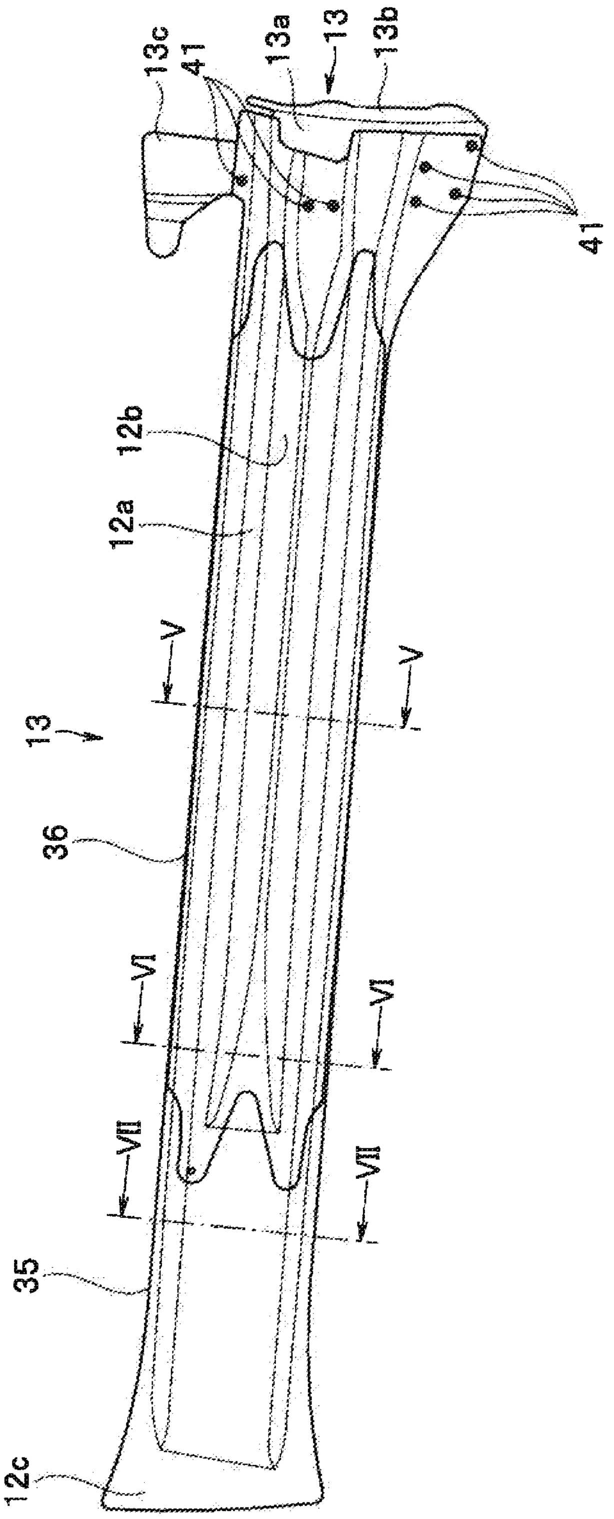
FIG. 4 is a side view of a door beam as viewed from an outer side in a vehicle width direction.
Figure 5:
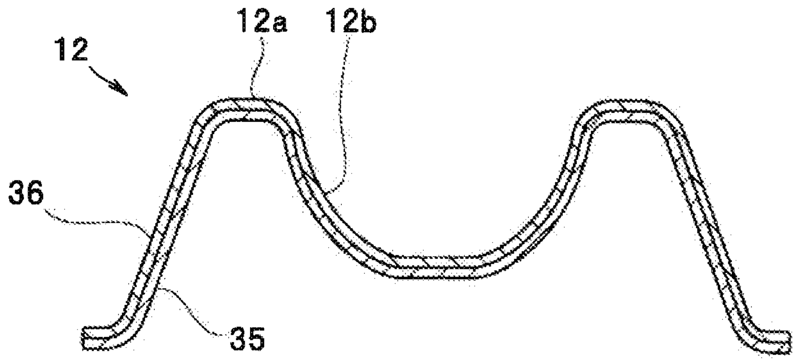
FIG. 5 is a cross-sectional view taken along line V-V in FIG. 4.
Figure 6:
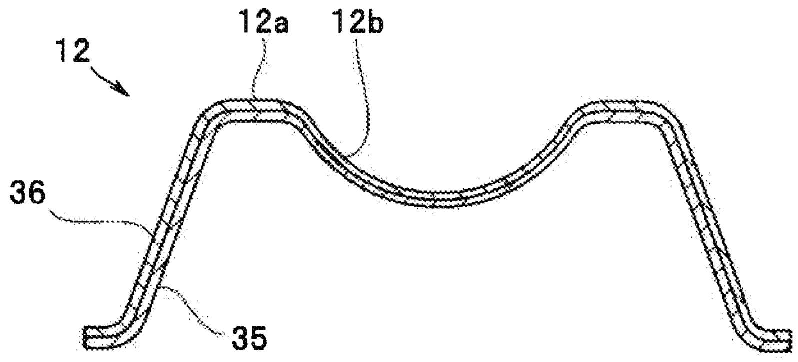
FIG. 6 is a cross-sectional view taken along line VI-VI in FIG. 4.
Figure 7:
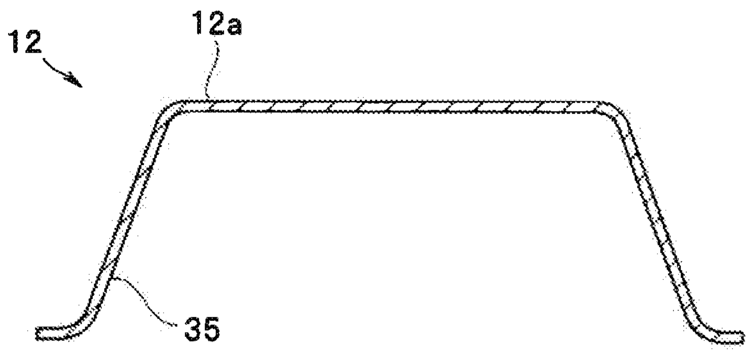
FIG. 7 is a cross-sectional view taken along line VII-VII in FIG. 4.
Figure 8:
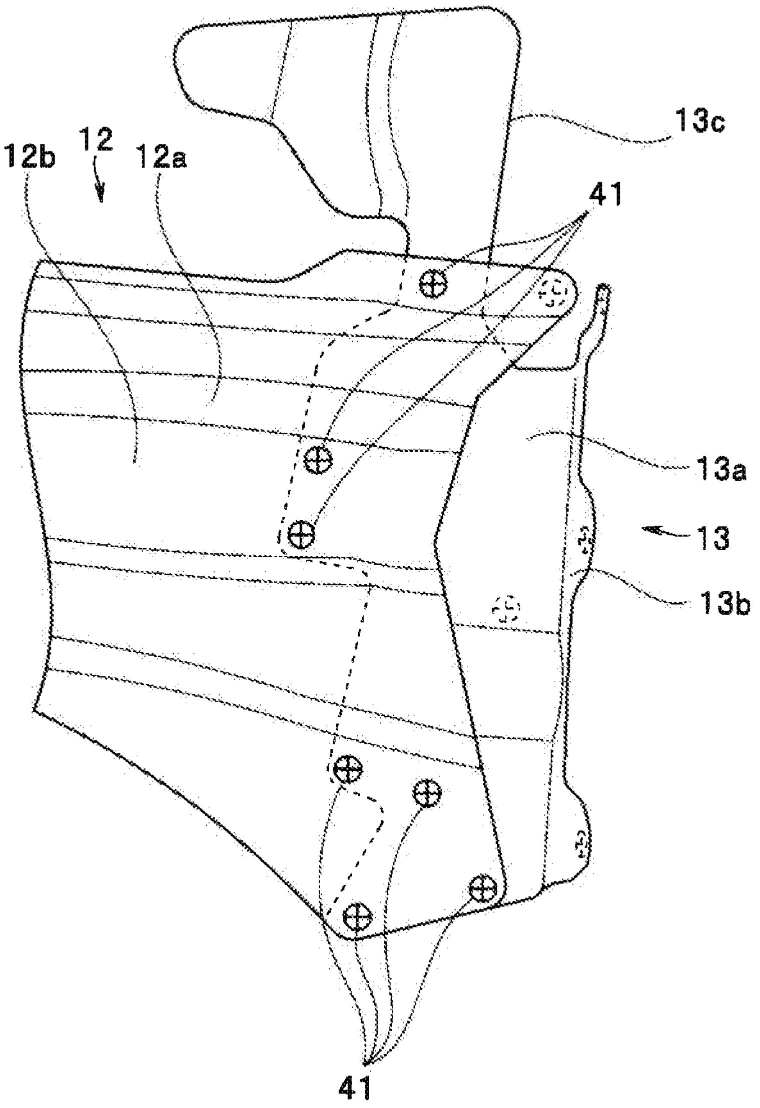
FIG. 8 is a perspective view of a rear end of the door beam and a bracket as viewed from the outer side in the vehicle width direction.
Figure 9:
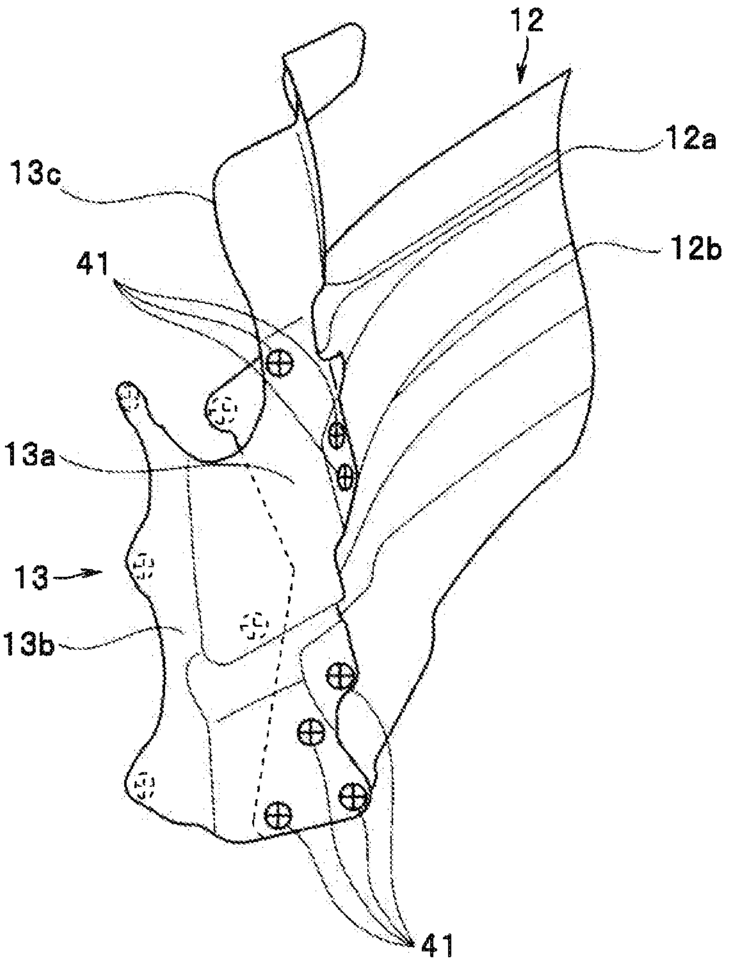
FIG. 9 is a perspective view of the rear end of the door beam and the bracket as viewed from an inner side in the vehicle width direction.

As illustrated in FIGS. 2 and 3, the door 5 includes an inner panel 10, an outer panel 11, and a door beam 12.

The inner panel 10 includes a sheet metal member made of a steel plate or the like having a predetermined plate thickness. The inner panel 10 includes a panel main body 15, an inner peripheral side wall 16, a stepped portion 17, an outer peripheral side wall 18, and a flange 19. The panel main body 15, the inner peripheral side wall 16, the stepped portion 17, the outer peripheral side wall 18, and the flange 19 are formed, for example, by press molding the sheet metal member.

The panel main body 15 extends in a front-rear direction of the vehicle body 2 in a state in which the door opening 3 is closed by the door 5.

The inner peripheral side wall 16 extends from an edge of the panel main body 15 in a taper shape in a direction intersecting the panel main body 15. That is, the inner peripheral side wall 16 extends from the edge of the panel main body 15 toward an outer side in the vehicle width direction (in a thickness direction of the door 5) at a predetermined inclination angle in a state in which the door opening 3 is closed by the door 5.

The stepped portion 17 extends from an end of the inner peripheral side wall 16 toward the outer side of the inner peripheral side wall 16. That is, the stepped portion 17 extends from the end of the inner peripheral side wall 16 in a direction substantially parallel to the panel main body 15.

The outer peripheral side wall 18 extends from an edge of the stepped portion 17 in a taper shape in a direction intersecting the stepped portion 17 (panel main body 15). That is, the outer peripheral side wall 18 extends from the edge of the stepped portion 17 toward the outer side in the vehicle width direction at a predetermined inclination angle in the state in which the door opening 3 is closed by the door 5. In one embodiment, the outer peripheral side wall 18 may serve as an example of a "wall" extending in the direction intersecting the panel main body 15.

The flange 19 extends from an end of the outer peripheral side wall 18 toward the outer side of the outer peripheral side wall 18. That is, the flange 19 extends from the end of the outer peripheral side wall 18 in a direction substantially parallel to the panel main body 15 and the stepped portion 17.

At a rear portion of the inner panel 10 configured in this manner, the ratchet mechanism 7 is fixed to the inner peripheral side wall 16 by screwing or the like.

Figure 10:
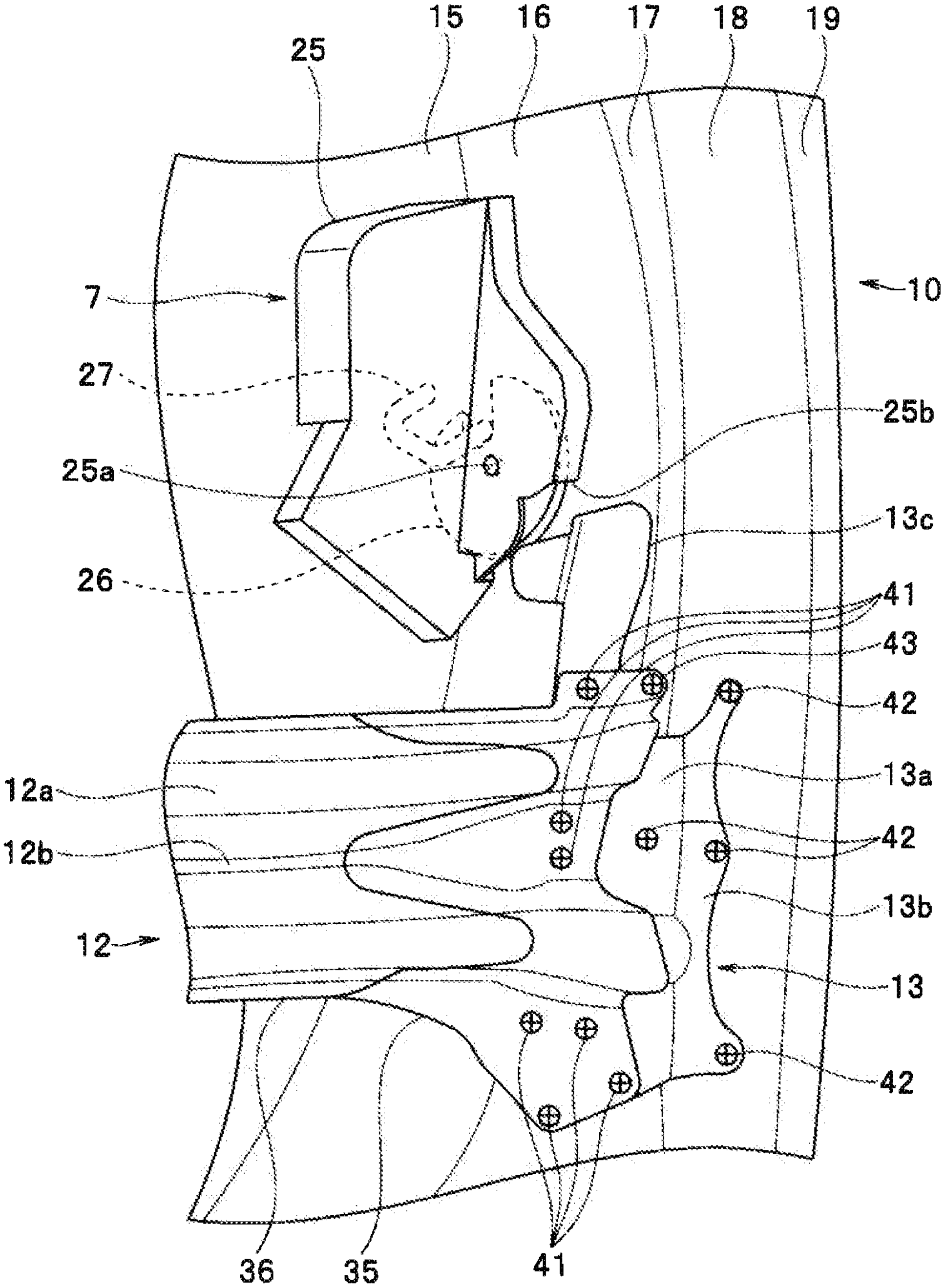
FIG. 10 is a perspective view illustrating a relation between a ratchet mechanism and the bracket when the door is locked.
Figure 11:
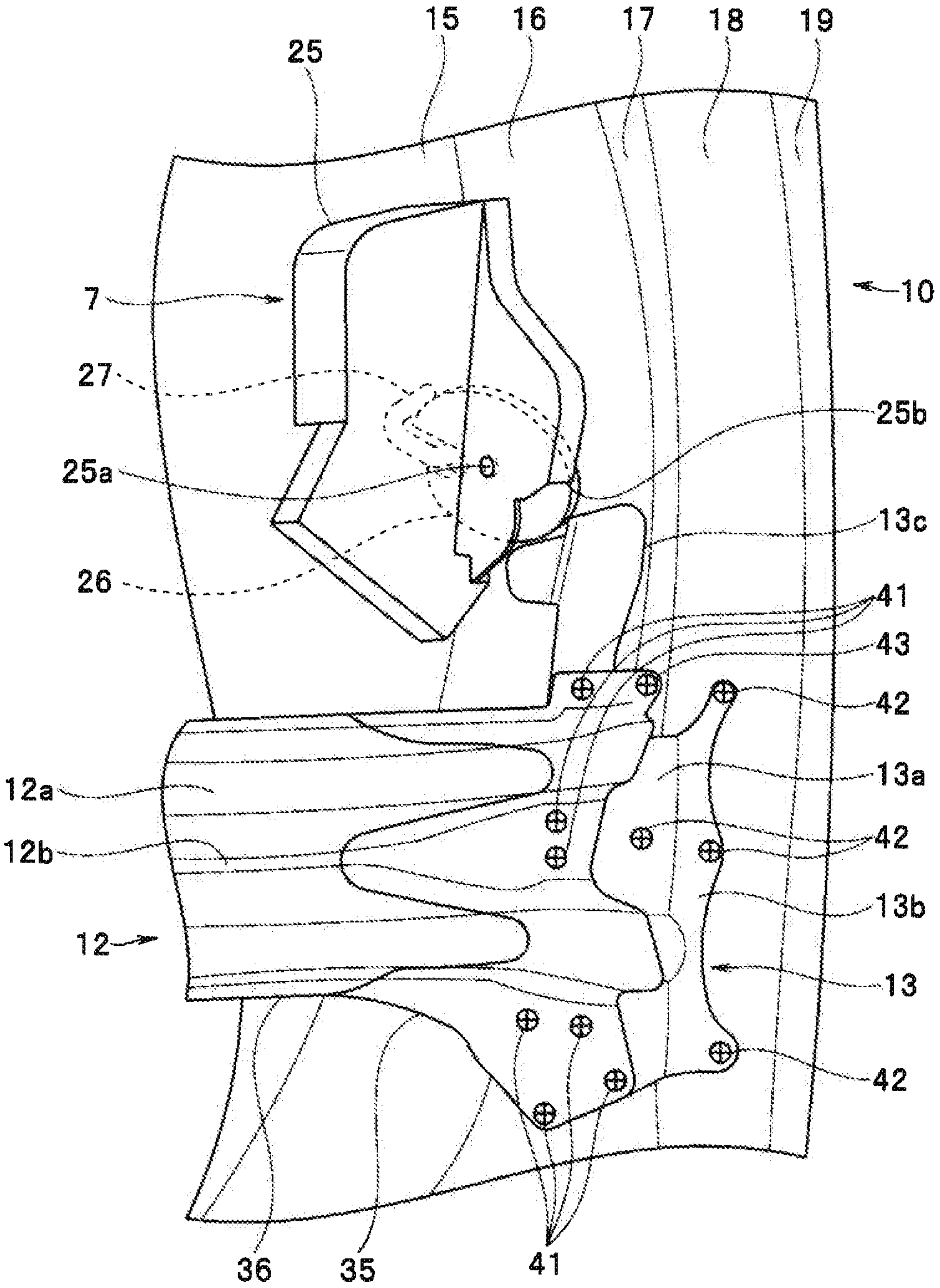
FIG. 11 is a perspective view illustrating a relation between the ratchet mechanism and the bracket when the door is unlocked.

As illustrated in FIGS. 10 and 11, the ratchet mechanism 7 includes a ratchet 26 inside a housing 25. The ratchet 26 is a member engageable with a striker 27 provided at the rear portion of the door opening 3. The ratchet 26 is swingably supported inside the housing 25 via a shaft 25*a*. In addition, a part of the ratchet 26 is exposed to an outside of the housing 25 via an opening 25*b* provided in the housing 25.

Basically, the ratchet 26 is held, by being urged by a return spring (not illustrated), at a rotation position where the ratchet 26 engages with the striker 27. With this engagement, the ratchet 26 maintains the state in which the door opening 3 is closed by the door 5.

On the other hand, when a door handle 30 (described later) attached to the outer panel 11 of the door 5 or a door handle (not illustrated) attached to the inner panel is operated, the ratchet 26 pivots, against an urging force of the return spring, to a position where the striker 27 is released. This release allows the ratchet 26 to open the door 5.

Here, a protrusion amount of the ratchet 26 from the opening 25*b* is set such that a protrusion amount when the ratchet 26 is at the rotation position where the engagement with the striker 27 is released is larger than a protrusion amount when the ratchet 26 is at the rotation position where the ratchet 26 engages with the striker 27. Such adjustment of the protrusion amount of the ratchet 26 can be performed, for example, by adjusting arrangement of the shaft 25*a* with respect to the ratchet 26 and the housing 25.

In addition, a weather strip 28 used for achieving watertightness with the door opening 3 is provided on an inner surface of the inner panel 10 in the vehicle width direction. The weather strip 28 is held, for example, by the stepped portion 17 along an outer peripheral surface of the inner peripheral side wall 16.

The outer panel 11 is formed, for example, by pressing a sheet metal member made of a steel plate or the like having a predetermined plate thickness. An outer edge of the outer panel 11 is joined to the flange 19 of the inner panel 10 by a hemming process or the like. Further, an outer shell of the door 5 having a space therein is formed by the joining of the outer panel 11 and the inner panel 10.

The door handle 30 is attached to a rear portion of an outer surface side of the outer panel 11. The door handle 30 is coupled to the ratchet mechanism 7 via a rod (not illustrated) inside the door 5.

The door beam 12 includes, for example, a sheet metal member including a high-tensile steel plate thicker than the inner panel 10.

The door beam 12 is formed, for example, by press molding the sheet metal member. For example, in the present embodiment, the door beam 12 is formed by hot pressing a sheet metal composite body of the high-tensile steel plate including a sheet metal main body 35 and a reinforcing sheet metal 36 partially superposed and disposed in a longitudinal direction of the sheet metal main body 35.

As illustrated in FIGS. 2 to 7, the door beam 12 has a basic shape of a substantially hat shape in cross section, which includes a ridge 12*a* protruding toward the outer panel 11 (outer side in the vehicle width direction) at a center portion in a width direction. Further, a bead 12*b* with a substantially U shape protruding toward the inner panel 10 is formed at a suitable position of the ridge 12*a*. Further, a flat flange 12*c* is formed on a tip end of the door beam 12.

Here, as described above, the door beam 12 according to the present embodiment is formed by hot pressing. In the hot pressing, a sheet metal material heated to a high temperature is molded once. Therefore, an irregular shape of the door beam 12 according to the present embodiment is basically formed by simply bending (bending in which a polygonal line extends along a longitudinal direction) the sheet metal composite body in the width direction.

The door beam 12 configured in this manner is disposed along the front-rear direction of the vehicle body 2 from the stepped portion 17 provided on the front portion of the inner panel 10 to the stepped portion 17 provided on the rear portion of the inner panel 10.

Further, a front end of the door beam 12 is joined to the inner panel 10 by welding the flange 12*c* to the stepped portion 17. In FIGS. 2 and 3, a reference numeral 40 denotes a weld portion between the front end of the door beam 12 and the inner panel 10.

On the other hand, a rear end of the door beam 12 is joined to the inner panel 10 via a bracket 13. The bracket 13 includes, for example, a sheet metal member made of a steel plate or the like thicker than the inner panel 10 and thinner than the door beam 12.

As illustrated in FIGS. 2 to 4 and 8 to 11, the bracket 13 has a beam joint 13*a* and a panel joint 13*b*. The bracket 13 is formed, for example, by performing a normal press process (cold press process) on a sheet metal member having a hardness higher than that of the inner panel 10 and lower than that of the door beam 12. As is well known, the cold press process enables molding multiple times, and thus the cold press process has a higher degree of freedom in processing than that of a hot press process.

The beam joint 13*a* is formed into a shape appropriately conforming to a bent shape of the rear end of the door beam 12. The beam joint 13*a* is welded in surface contact with the rear end of the door beam 12. Accordingly, the beam joint 13*a* is joined to the door beam 12. In the drawings, a reference numeral 41 denotes a weld portion between the door beam 12 and the beam joint 13*a*.

The panel joint 13*b* is formed into an approximately flat plate shape conforming to a shape of the outer peripheral side wall 18. The panel joint 13*b* is welded in surface contact with the stepped portion 17 and the outer peripheral side wall 18. Accordingly, the panel joint 13*b* is joined to the inner panel 10. In the drawings, a reference numeral 42 denotes a weld portion between the inner panel 10 (the stepped portion 17 and the outer peripheral side wall 18) and the panel joint 13*b*.

Here, the rear end of the door beam 12 may be additionally welded directly to the inner panel 10 as necessary. In the drawings, a reference numeral 43 denotes a weld portion between the door beam 12 and the inner panel 10.

The door beam 12 whose front and rear ends are coupled to the inner panel 10 in this manner is in contact with the outer panel 11 via mastic sealers 45.

Further, the bracket 13 includes a protrusion 13*c*. The protrusion 13*c* extends, for example, from the beam joint 13*a* and faces the opening 25*b* of the ratchet mechanism 7.

Figure 12:
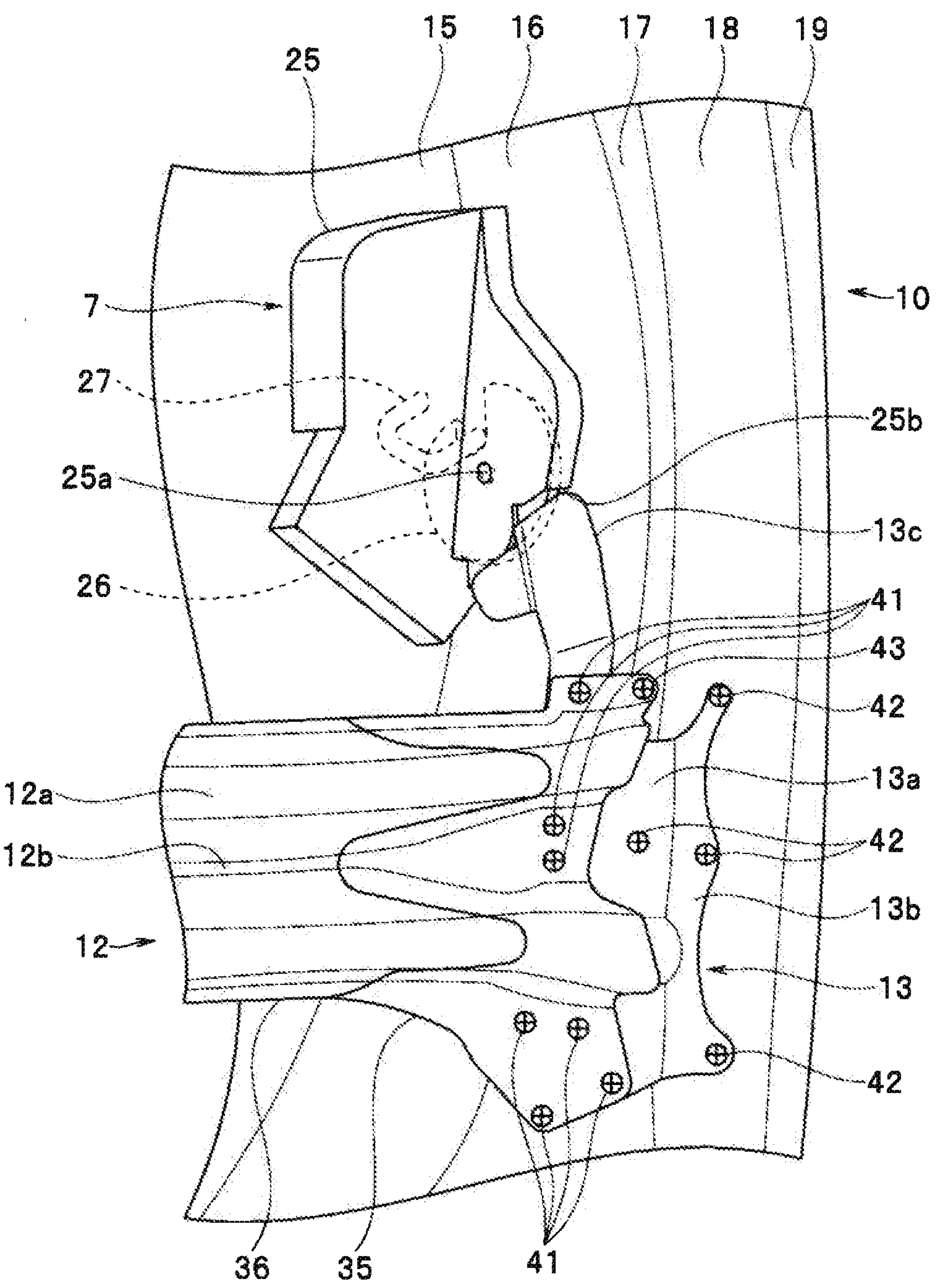
FIG. 12 is a perspective view illustrating a relation between the ratchet mechanism and the bracket in a side collision.

When the door 5 is deformed due to a side collision or the like, the protrusion 13*c* can be inclined toward the ratchet mechanism 7 due to the deformation. Further, the inclined protrusion 13*c* interferes with the ratchet 26 exposed from the opening 25*b* (see FIG. 12). Due to this interference, the protrusion 13*c* serves as a stopper that inhibits pivoting of the ratchet 26.

According to such an embodiment, the vehicle side door 5 includes the inner panel 10 having the wall (outer peripheral side wall 18) extending in the direction intersecting with the panel main body 15 extending in the front-rear direction of the vehicle body 2, the door beam 12 extending in the front-rear direction of the vehicle body 2 and joined to the front and rear portions of the inner panel 10, and the bracket 13 interposed between the inner panel 10 and the rear end of the door beam 12. Further, the bracket 13 has the beam joint 13*a* that is in surface contact with and welded to the rear end of the door beam 12, and the panel joint 13*b* that is in surface contact with and welded to the outer peripheral side wall 18 of the inner panel 10. Thus, it is possible to further improve safety of an occupant against a side collision.

That is, the bracket 13 obtained by molding a steel plate or the like that can be easily molded is interposed between the inner panel 10 and the rear end of the door beam 12. Accordingly, even when the door beam 12 is formed of high-tensile steel or the like that is difficult to mold in a complicated manner, the degree of freedom in a coupling form between the inner panel 10 and the door beam 12 can be improved.

Further, the beam joint 13*a* of the bracket 13 is welded in surface contact with the rear end of the door beam 12. Accordingly, the bracket 13 can be firmly fixed to the door beam 12 by many hitting points (welded portions 41).

In addition, the panel joint 13*b* of the bracket 13 is welded in surface contact with the outer peripheral side wall 18 of the inner panel 10. Accordingly, a shear direction of the welded portion 42, which is a substantial coupling portion between the inner panel 10 and the rear end of the door beam 12, can be made to substantially coincide with an input direction of a load in a side collision or opening and closing the door 5. Here, a strength of the welded portion 42 in the shear direction is significantly higher than a strength of the welded portion 42 in a peeling direction. Therefore, the door beam 12 formed of high-tensile steel or the like can be coupled to the inner panel 10 with high durability and impact resistance (rigidity).

In addition, the bracket 13 is thicker than the inner panel In addition, a hardness of the bracket 13 is set higher than a hardness of the inner panel 10 and lower than a hardness of the door beam 12. Therefore, it is possible to join the rear end of the door beam 12 to the inner panel 10 by welding members whose plate thicknesses and strengths change in a stepwise manner. By such stepwise welding, a joining strength can be increased as compared with a case where the door beam 12 and the inner panel which differ greatly in plate thickness and strength, are directly welded. Therefore, even in this respect, the door beam 12 formed of high-tensile steel or the like can be coupled to the inner panel 10 with high durability and collision resistance.

In addition, the bracket 13 includes the protrusion 13*c* that deforms and interferes with the ratchet 26 in a side collision. Therefore, opening the door 5 in a side collision or the like can be prevented by a simple configuration without adding a new component. Therefore, the safety of an occupant against a side collision or the like can be ensured at a higher level.

The disclosure in the above embodiment is not to be limited to the described modes and may be modified in various manners at an implementation stage without departing from the subject matter. For example, a configuration is described in which the rear end of the door beam 12 is coupled to the inner panel 10 via the bracket 13 in the above-described embodiment, and the disclosure is not limited to this configuration. For example, the front end of the door beam 12 may be coupled to the inner panel 10 via the bracket 13.

In addition, a configuration is described in which the door beam is formed by molding a sheet metal in the above-described embodiment, and the disclosure is not limited to this configuration. For example, a pipe-shaped door beam may be used as the door beam.

Further, the above-described embodiment includes disclosures at various stages, and various disclosures can be extracted from appropriate combinations of multiple disclosed elements.

For example, even when some elements are removed from all the elements described in the above-described embodiment, a configuration from which these elements have been removed can be derived as a disclosure insofar as the stated circumstances can be addressed and the stated effects can be obtained.

The invention claimed is:

1. A vehicle side door for a vehicle, the vehicle side door comprising:

an inner panel including a wall extending in a vehicle width direction intersecting a panel main body extending in a front-rear direction of a vehicle body of the vehicle;

a door beam extending in the front-rear direction of the vehicle body and joined to a front portion of the inner panel and a rear portion of the inner panel;

a single-piece bracket interposed between the inner panel and the door beam;

an inner peripheral side wall that extends from an edge of the panel main body in the vehicle width direction intersecting the panel main body; and a stepped portion that extends from an end of the inner peripheral side wall in a direction parallel to the panel main body, wherein the single-piece bracket includes:

a beam joint welded in surface contact with an end of the door beam; and a panel joint welded in surface contact with both (i) the stepped portion and (ii) the wall of the inner panel at the same end of the door beam, the panel joint comprising a first flat portion lying flat against and welded to the stepped portion and a second flat portion lying flat against and welded to the wall, the first and second flat portions being angularly connected to each other by a bent portion that abuts a corner formed between the stepped portion and the wall, and wherein the wall is an outer peripheral side wall that extends from an edge of the stepped portion in a taper shape at an inclination angle in the vehicle width direction intersecting the stepped portion, such that the corner is defined between the stepped portion and the outer peripheral side wall.

2. The vehicle side door according to claim 1, wherein the single-piece bracket is interposed between a rear end of the door beam and the rear portion of the inner panel.

3. The vehicle side door according to claim 2, further comprising:

a ratchet mechanism comprising a ratchet engageable with a striker that is provided in a door opening of the vehicle body, the ratchet mechanism being attached to the wall at the rear portion of the inner panel, wherein the single-piece bracket includes a protrusion opposed to the ratchet mechanism, and wherein the protrusion is configured to deform to a position where the protrusion interferes with the ratchet in a side collision of the vehicle.

4. The vehicle side door according to claim 1, further comprising a flange that extends from an end of the wall in a direction parallel to the panel main body.

5. The vehicle side door according to claim 1, further comprising a flange that extends from an end of the wall in the direction parallel to the panel main body and the stepped portion.

6. The vehicle side door according to claim 1, wherein the door beam includes:

a ridge protruding toward an outer panel at a center portion in a width direction;

a bead with a U-shape protruding toward the inner panel formed at a suitable position of the ridge; and a flat flange formed on a tip end of the door beam.

7. The vehicle side door according to claim 1, wherein the door beam is disposed along the front-rear direction of the vehicle body from the stepped portion provided on the front portion of the inner panel to the stepped portion provided on the rear portion of the inner panel.

8. The vehicle side door according to claim 1, wherein a front end of the door beam is joined to the inner panel by welding to the stepped portion.

9. The vehicle side door according to claim 1, wherein the panel joint is welded in surface contact with the wall of the inner panel on a side of the beam opposite to the panel main body.

10. The vehicle side door according to claim 1, wherein the beam joint is formed into a shape conforming to a bent shape of a rear end of the door beam.

11. The vehicle side door according to claim 1, wherein the panel joint is formed into a flat plate shape conforming to a shape of the wall.

12. The vehicle side door according to claim 1, wherein the beam joint is formed into a shape conforming to a bent shape of a rear end of the door beam, and wherein the panel joint is formed into a flat plate shape conforming to a shape of the wall.

13. The vehicle side door according to claim 1, wherein at least one of the following conditions is satisfied:

(i) the single-piece bracket is thicker than the inner panel;

(ii) a strength of the single-piece bracket is greater than a strength of the inner panel and less than a strength of the door beam.

14. A vehicle side door for a vehicle, the vehicle side door comprising:

an inner panel including a wall extending in a vehicle width direction intersecting a panel main body extending in a front-rear direction of a vehicle body of the vehicle;

a door beam extending in the front-rear direction of the vehicle body and joined to a front portion of the inner panel and a rear portion of the inner panel;

a bracket interposed between the inner panel and the door beam;

an inner peripheral side wall that extends from an edge of the panel main body in the vehicle width direction intersecting the panel main body; and a stepped portion that extends from an end of the inner peripheral side wall in a direction parallel to the panel main body, wherein the bracket includes:

a beam joint welded in surface contact with an end of the door beam;

a panel joint welded in surface contact with the stepped portion and the wall of the inner panel; and a protrusion extending from the bracket, further comprising:

a ratchet mechanism comprising a ratchet engageable with a striker that is provided in a door opening of the vehicle body, the ratchet mechanism being attached to the wall at the rear portion of the inner panel, wherein the protrusion is opposed to the ratchet mechanism in a normal state of the vehicle side door, wherein the protrusion is configured to deform, in a side collision of the vehicle, to a position where the protrusion interferes with rotation of the ratchet so as to prevent the ratchet from releasing the striker, and wherein the wall is an outer peripheral side wall that extends from an edge of the stepped portion in a taper shape at an inclination angle in the vehicle width direction intersecting the stepped portion, such that a corner is defined between the stepped portion and the outer peripheral side wall.

15. The vehicle side door according to claim 14, wherein the protrusion extends from the beam joint.

* * * * *